(12) United States Patent
Paek

(10) Patent No.: US 12,542,960 B2
(45) Date of Patent: Feb. 3, 2026

(54) CAMERA MODULE

(71) Applicant: SAMSUNG ELECTRO-MECHANICS CO., LTD., Suwon-si (KR)

(72) Inventor: Seungyun Paek, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 32 days.

(21) Appl. No.: 18/409,406

(22) Filed: Jan. 10, 2024

(65) Prior Publication Data

US 2024/0314419 A1 Sep. 19, 2024

(30) Foreign Application Priority Data

Mar. 16, 2023 (KR) .......... 10-2023-0034763
Jul. 7, 2023 (KR) .......... 10-2023-0088229

(51) Int. Cl.
*H04N 23/55* (2023.01)
*H04N 23/51* (2023.01)

(52) U.S. Cl.
CPC ............. *H04N 23/55* (2023.01); *H04N 23/51* (2023.01)

(58) Field of Classification Search
CPC ................................ H04N 23/51; H04N 23/55
See application file for complete search history.

(56) References Cited

U.S. PATENT DOCUMENTS

| | | | |
|---|---|---|---|
| 2021/0247663 A1* | 8/2021 | Lee | G03B 30/00 |
| 2022/0066290 A1 | 3/2022 | Kim et al. | |
| 2023/0012973 A1 | 1/2023 | Lim et al. | |
| 2023/0408735 A1* | 12/2023 | Lim | G02B 7/09 |

FOREIGN PATENT DOCUMENTS

| | | |
|---|---|---|
| KR | 10-2279920 B1 | 7/2021 |
| KR | 10-2369442 B1 | 3/2022 |
| KR | 10-2022-0059389 A | 5/2022 |
| KR | 10-2023-0011772 A | 1/2023 |

OTHER PUBLICATIONS

Korean Office Action Issued on Jan. 7, 2025, in Counterpart Korean Patent Application No. 10-2023-0088229 (6 Pages in English, 6 Pages in Korean).
Korean Office Action issued on Jul. 29, 2025, in counterpart Korean Patent Application No. 10-2023-0088229 (1 page in English, 2 pages in Korean).

* cited by examiner

*Primary Examiner* — Ayman A Abaza
(74) *Attorney, Agent, or Firm* — NSIP Law

(57) ABSTRACT

A camera module includes a lens holder configured to accommodate a lens module; a carrier configured to accommodate the lens holder; a lens driver cover disposed on the carrier to cover the lens holder; and a buffering member including a first portion fixed to the lens driver cover, a second portion extending from the first portion and including a dome-type protruding portion, a third portion extending from the first portion opposite to the second portion, and a groove extending from a bottom surface of the third portion toward the first portion. A maximum depth of the groove measured from the bottom surface of the third portion is greater than a maximum height of the third portion measured from the bottom surface of the third portion and smaller than a maximum height of the first portion measured from the bottom surface of the third portion.

17 Claims, 10 Drawing Sheets

CAMERA MODULE

CROSS-REFERENCE TO RELATED APPLICATION

This application claims the benefit under 35 USC 119(a) of Korean Patent Application Nos. 10-2023-0034763 filed on Mar. 16, 2023, and 10-2023-0088229 filed on Jul. 7, 2023, in the Korean Intellectual Property Office, the entire disclosures of which are incorporated herein by reference for all purposes.

BACKGROUND

1. Field

The following description relates to a camera module.

2. Description of the Background

As information communication technology and semiconductor technology develop, the spread and use of electronic devices are increasing rapidly.

Electronic devices provide various functions by convergence outside their traditional unique areas.

Cameras are adopted in portable electronic devices such as smartphones, tablet PCs, and laptop computers, and an autofocus (AF) function, an image stabilizer (IS) function, and a zoom function are added to the camera of such a portable electronic device.

A camera module may be disposed in a shield portion such as a shield can or shield case to protect it from external interference (e.g., electromagnetic interference, EMI), and may be mounted on an electronic device using a bracket.

In this case, when impact is applied to the shield can or shield case based on the movement of a lens barrel included in the camera module, the seam of the shield can, or shield case may be separated due to the impact.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens holder configured to accommodate a lens module; a carrier configured to accommodate the lens holder; a lens driver cover disposed on the carrier to cover the lens holder; and a buffering member, disposed on the lens driver cover, including a first portion fixed to the lens driver cover, a second portion extending from the first portion and including a dome-type protruding portion, a third portion extending from the first portion opposite to the second portion, and a groove extending from a bottom surface of the third portion toward the first portion. A maximum depth of the groove measured from the bottom surface of the third portion is greater than a maximum height of the third portion measured from the bottom surface of the third portion and smaller than a maximum height of the first portion measured from the bottom surface of the third portion, along a first direction parallel with an optical axis of the lens module.

The camera module may further include a housing configured to accommodate the carrier, and a cover disposed on the housing and configured to cover the lens driver cover. The dome-type protruding portion may face the cover along the first direction.

The third portion may face the lens holder along the first direction.

The first portion may form a recess portion having a width narrower than a width of the second portion and a width of the third portion along a second direction perpendicular to the optical axis. The lens driver cover may be fixed to the recess portion of the buffering member.

The dome-type protruding portion may overlap the groove along the first direction.

A width of the dome-type protruding portion may be narrower than a width of the groove along a second direction perpendicular to the optical axis.

The width of the groove may taper toward an upper surface of the groove, and the groove may have a minimum width at the upper surface of the groove along the second direction.

The width of the dome-type protruding portion may be narrower than the minimum width of the groove.

The dome-type protruding portion may overlap the groove along the first direction, and a width of the dome-type protruding portion may be narrower than a width of the groove along a second direction perpendicular to the optical axis.

The width of the groove may taper toward an upper surface of the groove, and the groove may have a minimum width at the upper surface of the groove.

The width of the dome-type protruding portion may be narrower than the minimum width of the groove along the second direction.

In another general aspect, a camera module includes a lens holder configured to accommodate a lens module; a carrier configured to accommodate the lens holder; a lens driver cover disposed on the carrier to cover the lens holder; and a buffering member, disposed on the lens driver cover, including a first portion fixed to the lens driver cover, a second portion extending from the first portion and including a dome-type protruding portion, a third portion extending from the first portion to a direction opposite to the second portion, and a groove extending from a bottom surface of the third portion toward the first portion. A width of the dome-type protruding portion of the buffering member is narrower than a width of the groove of the buffering member in a second direction perpendicular to an optical axis of the lens module.

The camera module may further include a housing configured to accommodate the carrier, and a cover disposed on the housing and configured to cover the lens driver cover. The dome-type protruding portion may face the cover along a first direction parallel with the optical axis of the lens module.

The third portion may face the lens holder along the first direction.

The first portion may form a recess portion having a width narrower than a width of the second portion and a width of the third portion along the second direction. The lens driver cover may be fixed to the recess portion of the buffering member.

The width of the groove in the second direction may taper toward an upper surface of the groove, and the groove may have a minimum width at the upper surface of the groove.

The width of the dome-type protruding portion may be narrower than the minimum width of the groove along the second direction.

Other features and aspects will be apparent from the following detailed description, the drawings, and the claims.

Figure 1:
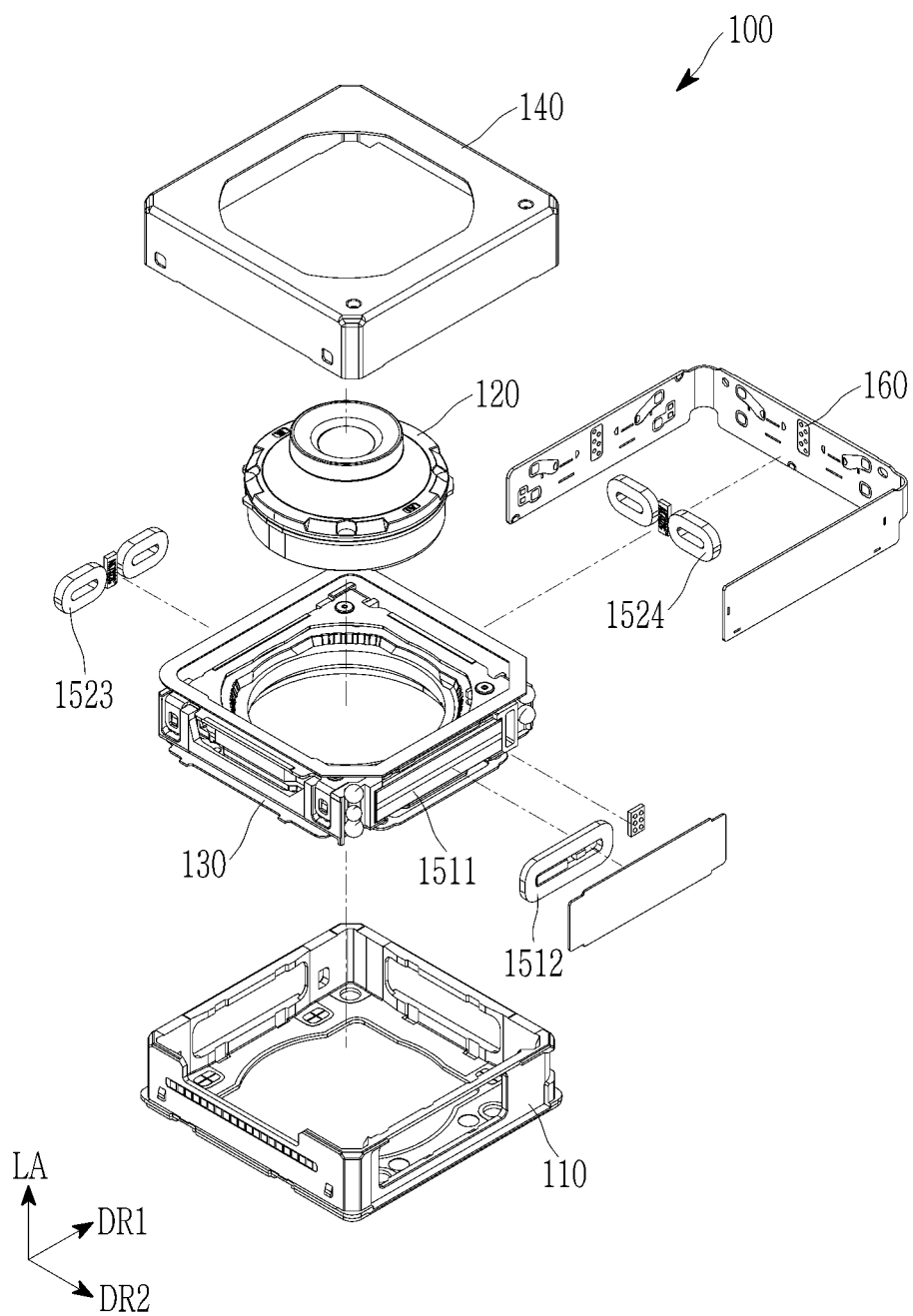
FIG. 1 is a schematic exploded perspective view of a camera module according to an embodiment.

Throughout the drawings and the detailed description, unless otherwise described, the same reference numerals refer to the same elements. The drawings may not be to scale, and the relative size, proportions, and depiction of elements in the drawings may be exaggerated for clarity, illustration, and convenience.

DETAILED DESCRIPTION

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

Further, throughout the specification, the phrase "on a plane" means viewing a target portion from the top, and the phrase "on a cross-section" means viewing a cross-section formed by vertically cutting a target portion from the side.

Figure 2:
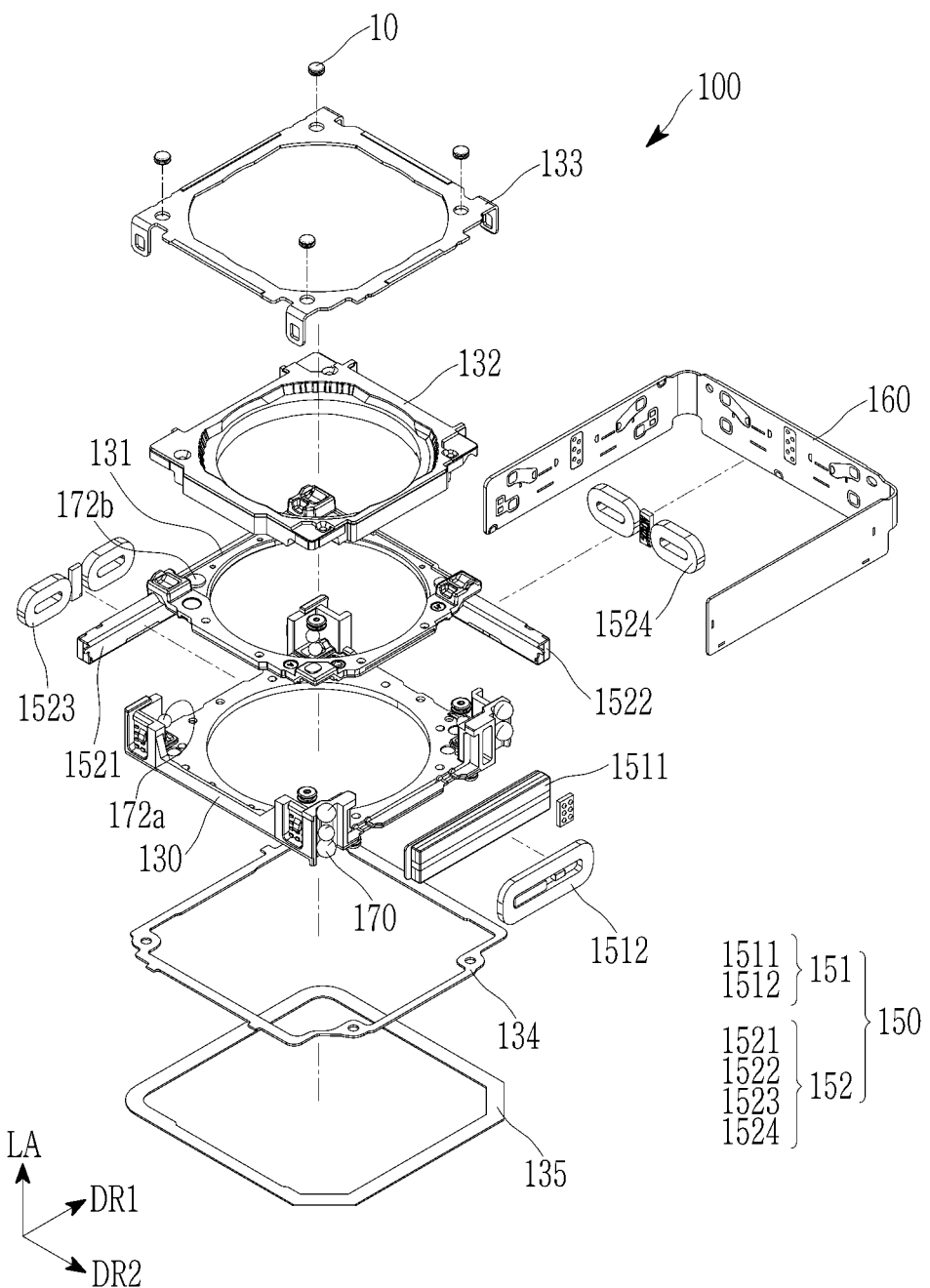
FIG. 2 is an exploded perspective view of a part of FIG. 1.

Referring to FIG. 1 and FIG. 2, a camera module according to an embodiment will be described. FIG. 1 is a schematic exploded perspective view of a camera module according to an embodiment, and FIG. 2 is an exploded perspective view of a part of FIG. 1.

Referring to FIG. 1 and FIG. 2, a camera module 100, according to an embodiment, may include a lens barrel 120, a carrier 130 accommodating the lens barrel 120, a lens driver 150 moving the lens barrel 120, a housing 110 accommodating the lens barrel 120 and the lens driver 150, and a cover 140.

The lens driver 150 is a device that moves the lens barrel 120 and may include a focusing driver 151 that adjusts a focus and a stabilization driver 152 that corrects shake.

The focusing driver 151 may generate driving force to move the lens barrel 120 and the carrier 130, which accommodates the lens barrel 120 in an optical axis direction of an optical axis LA.

The focusing driver 151 may include a magnet 1511 and a coil 1512. The magnet 1511 may be mounted on one side of the carrier 130, and the coil 1512 may be mounted to the housing 110.

When power is applied to a circuit portion 160 mounted on the housing 110, the carrier 130 may be moved in the optical axis direction by the electromagnetic influence between the magnet 1511 and the coil 1512.

Since the lens barrel 120 is accommodated in the carrier 130, the lens barrel 120 may also move in the optical axis direction as the carrier 130 moves.

A first rolling member 170 may be disposed between the carrier 130 and the housing 110 to reduce friction between the carrier 130 and the housing 110 during movement of the carrier 130. The first rolling member 170 may be in the form of a ball and may be disposed on either side of the magnet 1511. A guide groove may be formed in the carrier 130 to accommodate the first rolling member 170 to thereby guide in the optical axis direction.

The stabilization driver 152 may generate a driving force to move a guide member 131 that guides the movement of the lens barrel 120 in a direction that is perpendicular to the direction of the optical axis.

The stabilization driver 152 may include magnets 1521 and 1522 and coils 1523 and 1524. The magnets 1521 and 1522 are mounted on one side of the carrier 130, and the coils 1523 and 1524 facing the magnets 1521 and 1522, respectively, may be fixed to the housing 110.

The guide member 131 and a lens holder 132 are inserted into the carrier 130, disposed in the optical axis direction, and serve to guide the movement of the lens barrel 120.

The lens holder 132 may have a substantially rectangular frame shape. The magnets 1521 and 1522 of the stabilization driver 152 may be disposed on two side surfaces that are parallel with a first direction DR1 and a second direction DR2 that are perpendicular to an optical axis adjacent to the lens holder 132. A lens driver cover 133 may further be provided in an upper portion of the lens barrel 120 to prevent separation of the lens holder 132 from an inner space of the carrier 130, and the lens driver cover 133 may be combined with the carrier 130.

A plurality of second ball members 172a and plurality of third ball members 172b may be provided to support the stabilization driver 152, and the plurality of second ball members 172a and the plurality of third ball members 172b serve to guide the lens holder 132 during a stabilization process. In addition, the plurality of second ball members 172a and the plurality of third ball members 172b also serve to maintain a distance between the carrier 130 and the lens holder 132.

The lens barrel 120 and the lens driver 150 are accommodated in an inner space of the housing 110, and, for example, the housing 110 may have a box shape with open tops and bottoms. An image sensor unit may be disposed in a lower portion of the housing 110.

Insert members 134 and 135 may be disposed between the carrier 130 and the housing 110.

The cover 140 is combined with the housing 110 to surround an external surface of the housing 110, and serves to protect internal constituent parts of the camera module. In addition, the cover 140 may shield electromagnetic waves. For example, the cover 140 may shield the electromagnetic wave such that the electromagnetic wave generated from the camera module does not affect other electronic components in a portable electronic device.

In addition, since a portable electronic device is equipped with several electronic parts other than the camera module, the cover 140 may shield the electromagnetic wave such that the electromagnetic wave generated from the electronic parts does not affect the camera module. The cover 140 is made of a metallic material and may be grounded to a ground pad provided on a printed circuit board, thereby shielding electromagnetic waves.

A plurality of buffering members 10 may be coupled to the lens driver cover 133, and the plurality of buffering members 10 may mitigate and/or dampen the force exerted by external impact applied to the cover 140.

Hereinafter, a buffering member of the camera module will be described in more detail according to the embodiment described above.

Figure 3:
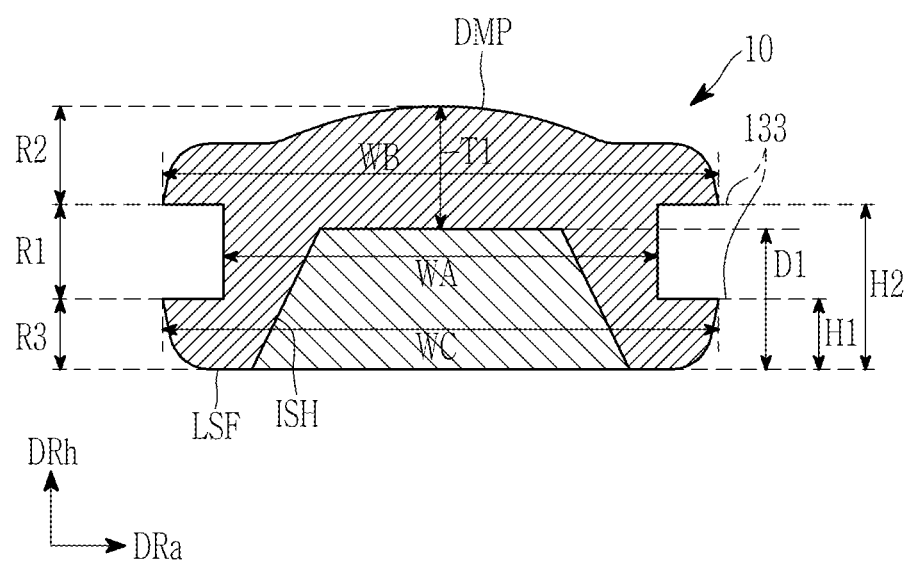
FIG. 3 is a cross-sectional view of a buffering member of the camera module according to an embodiment.

Then, referring to FIG. 3, a buffering member 10 of the camera module 100, according to an embodiment, will be described in more detail. FIG. 3 is a cross-sectional view of a buffering member of the camera module according to an embodiment.

Referring to FIG. 3, a buffering member 10 of the camera module 100, according to an embodiment, may include a first portion R1 combined with the lens driver cover 133, a second portion R2 expanded upward from the first portion R1 along a height direction DRh that is parallel with the optical axis LA of the lens module, and a third portion R3 expanded downward from the first portion R1 along the height direction DRh.

Along a horizontal direction Dra that is perpendicular to the optical axis LA of the lens module, the first portion R1 of the buffering member forms a recess portion such that a width WA of the first portion R1 is narrower than a width WB of the second portion R2 and a width WC of the third portion R3. The recess portion of the buffering member 10 is inserted into a hole in the lens driver cover 133, and thus the buffering member 10 may be combined with the lens driver cover 133.

The second portion R2 of the buffering member 10 may include a dome-type protruding portion DMP that is protruded upward along the height direction DRh that is parallel with the optical axis LA of the lens module and faces the second portion R2 from the third portion R3 of the buffering member 10. The dome-type protruding portion DMP may be disposed in a central portion of the buffering member 10 along the horizontal direction DRa.

Referring to FIG. 1 and FIG. 2, along the height direction DRh, the dome-type protruding portion DMP of the second portion R2 of the buffering member 10 may face the cover 140 of the camera module 100, and the third portion R3 of the buffering member 10 may face the lens holder 132 of the camera module 100.

When an impact is applied to the buffering member 10 from the outside along a direction parallel to the height direction DRh, the external impact may be concentrated on the protruded dome-type protruding portion DMP.

A groove ISH may be formed in a bottom surface LSF of the buffering member 10. Along the height direction DRh, a first depth D1, which is the maximum depth of the groove ISH from the bottom surface LSF of the buffering member 10, may be greater than a first height H1, which is the maximum height of the third portion R3 of the buffering member 10 measured from the bottom surface LSF of the buffering member 10, and smaller than a second height H2, which is the maximum height of the first portion R1.

A width of the groove ISH measured along the horizontal direction DRa may become narrower toward the first portion R1 from the bottom surface LSF of buffering member 10 along the height direction DRh.

The central portion of the buffering member 10, which includes the dome-type protruding portion DMP, may overlap the groove ISH. A first thickness T1, which is the maximum thickness of the central portion of the dome-type protruding portion DMP of the buffering member 10, may be greater than a thickness of the second portion R2 of the buffering member 10, and smaller than the sum of the thickness of the first portion R1 and the thickness of the second portion R2 of the buffering member 10.

As described, since a first depth D1, which is the maximum depth of the groove ISH formed in the bottom surface LSF of the buffering member 10, is greater than the height H1 of the third portion R3 of the buffering member 10 and the first thickness T1, which is the maximum thickness of the central portion of the buffering member 10 including the dome-type protruding portion DMP, is smaller than the sum of the thickness of the first portion R1 and the thickness of the second portion R2 of the buffering member 10 along the height direction DRh, the dome-type protruding portion DMP may be easily deformed by external impact applied to the protruded dome-type protruding portion DMP.

Therefore, the external impact applied to the buffering member 10 may be absorbed by the buffering member 10, and the effect of the amount of external impact transmitted to the cover 140 disposed on the buffering member 10 may be reduced.

Figure 4:
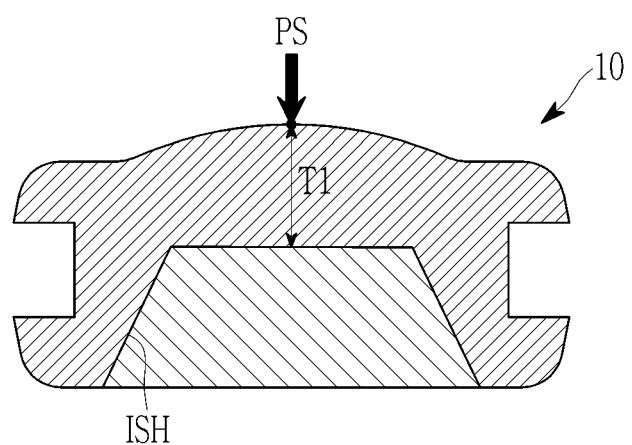
FIG. 4 and FIG. 5 are cross-sectional views of the case in which an external impact is applied to the buffering member of the camera module according to an embodiment.
Figure 5:
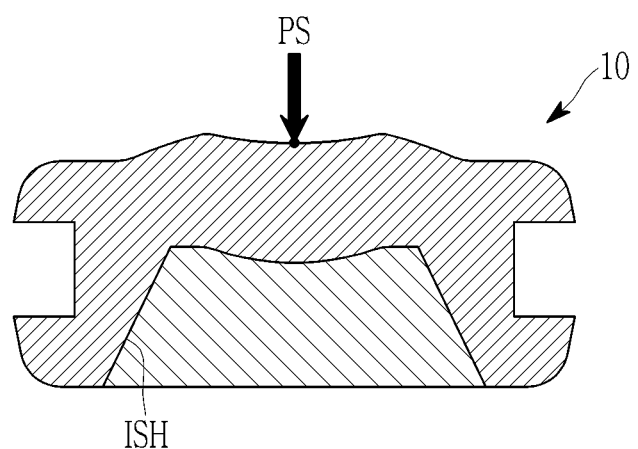
Figure 6:
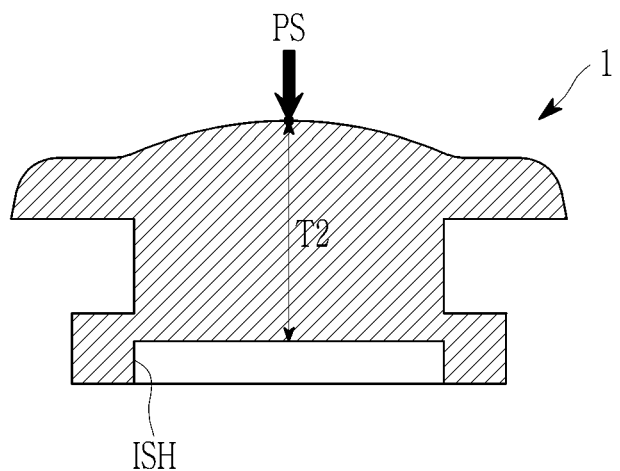
FIG. 6 is a cross-sectional view of a case in which an external impact is applied to a buffering member of a conventional camera module.

Referring to FIG. 4 to FIG. 6 together with FIG. 3, a change in the buffering member 10 when an external impact is applied to the buffering member 10 of the camera module 100 according to an embodiment will be described. FIG. 4 and FIG. 5 are cross-sectional views of the case in which an external impact is applied to the buffering member of the camera module according to an embodiment. FIG. 6 is a cross-sectional view of a case where an external impact is applied to a conventional camera module buffering member.

As shown in FIG. 4, when an external impact PS is applied to the buffering member 10, the external impact PS may be concentrated in the dome-type protruding portion DMP, which protrudes upward.

As described with reference to FIG. 3, the first depth D1, which is the maximum depth of the groove ISH formed in the bottom surface LSF of the buffering member 10 of the camera module 100 according to an embodiment, is greater than the height of the third portion R3 of the buffering member 10. The first thickness T1, which is the maximum thickness of the central portion of the buffering member 10, including the dome-type protruding portion DMP that overlaps the groove ISH, is smaller than the sum of the thickness of the first portion R1 and the thickness of the second portion R2 of the buffering member 10, and accordingly, the dome-type protruding portion DMP may be deformed due to the external impact applied to the protruded dome-type protruding portion DMP as shown in FIG. 5.

As described, the external impact PS applied to the buffering member 10 may be absorbed by the buffering member 10. Thus, compared to the case where the buffering member 10 is not easily deformed, the external impact amount according to the external impact PS transmitted to the cover 140 disposed on the buffering member 10 may be relatively small.

Referring to FIG. 6, the depth of a groove ISH formed in the bottom surface of a buffering member 1 of a conventional camera module may be smaller than the height of a third portion R3 of the buffering member 1, and a second thickness T2, which is the maximum thickness of a central portion of a dome-type protruding portion DMP of the buffering member 1, may be greater than the sum of a thickness of a first portion R1 and a thickness of a second portion R2. Refer to FIG. 3 for definitions of R1, R2, and R3. As described, when the second thickness T2, which is the maximum thickness of the central portion of the buffering member 1 that includes the dome-type protruding portion DMP, is thick, the central portion of the buffering member 1 including the dome-type protruding portion DMP, may not be easily deformed even though an external impact PS is applied to the dome-type protruding portion DMP of the buffering member 1 from the outside.

As such, since the buffering member 1 is not deformed by the external impact PS, the external impact PS may not be absorbed by the buffering member 1, and the amount of external impact according to the external impact PS is easily transmitted to the cover 140. Accordingly, the seam of the cover 140 may be deformed.

Figure 7:
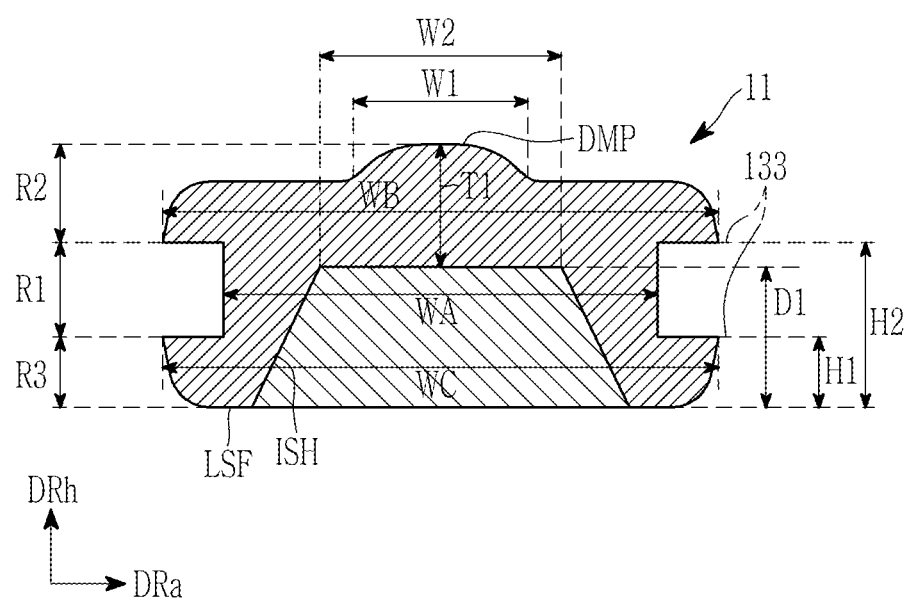
FIG. 7 is a cross-sectional view of a buffering member of a camera module according to another embodiment.

Next, referring to FIG. 7, a buffering member 11 of a camera module 100, according to another embodiment, will be described in more detail. FIG. 7 is a cross-sectional view of a buffering member of a camera module according to another embodiment.

Referring to FIG. 7, a buffering member 11, according to the present embodiment, is similar to the buffering member 10 of the camera module according to the embodiment described with reference to FIG. 3.

The buffering member 11, according to the present embodiment, may include a first portion R1 combined with a lens driver cover 133, a second portion R2 expanded upward along a height direction DRh that is parallel with an optical axis LA of a lens module, and a third portion R3 expanded downward from the first portion R1 along the height direction DRh.

Along a horizontal direction DRa that is perpendicular to the optical axis LA of the lens module, the first portion R1 of the buffering member 11 forms a recess portion such that a width WA of the first portion R1 is narrower than a width WB of the second portion R2 and a width WC of the third portion R3. The recess portion of the buffering member 11 is inserted into a hole in the lens driver cover 133, and thus the buffering member 11 may be combined with the lens driver cover 133.

The second portion R2 of the buffering member 11 may include a dome-type protruding portion DMP protruded upward along the height direction DRh. The dome-type protruding portion DMP may be disposed in a central portion of the buffering member 11 along the horizontal direction DRa.

When an impact is applied to the buffering member 11 from the outside along a direction parallel to the height direction DRh, the external impact may be concentrated on the protruded dome-type protruding portion DMP.

A groove ISH may be formed in a bottom surface LSF of the buffering member 11.

Along the height direction DRh, a first depth D1, which is the maximum depth of the groove ISH from the bottom surface LSF of the buffering member 11, may be greater than a first height H1, which is the maximum height of the third portion R3 of the buffering member 11 measured from the bottom surface LSF of the buffering member 11, and smaller than a second height H2, which is the maximum height of the first portion R1.

A first thickness T1, which is the maximum thickness of the central portion of the buffering member 11, including the dome-type protruding portion DMP, is smaller than the sum of a thickness of the first portion R1 and a thickness of the second portion R2 of the buffering member 11, and greater than the thickness of the second portion R2 of the buffering member 11.

A width of the groove ISH measured along the horizontal direction DRa may become narrower toward the first portion R1 from the bottom surface LSF of buffering member 11 along the height direction DRh.

Unlike the buffering member 10 of the camera module according to the embodiment described with reference to FIG. 3, according to the present embodiment, a first width W1 of the dome-type protruding portion DMP of the buffering member may be smaller than a second width W2 of an upper surface of the groove ISH formed in the bottom surface LSF of the buffering member 11 along the horizontal direction DRa.

As described, the first depth D1, which is the maximum depth of the groove ISH formed in the bottom surface LSF of the buffering member 11, is greater than the maximum height of the third portion R3 of the buffering member 11. The first thickness T1, which is the maximum thickness of the central portion of the buffering member 11, including the dome-type protruding portion DMP that overlaps the groove ISH, is smaller than the sum of the thickness of the first portion R1 and the thickness of the second portion R2 of the buffering member 11. In addition, the first width W1 of the dome-type protruding portion DMP of the buffering member 11 may be smaller than the second width W2 of the upper surface of the groove ISH formed in the bottom surface LSF of the buffering member 11.

Therefore, the dome-type protruding portion DMP may be easily deformed by external impact applied to the protruded dome-type protruding portion DMP. Accordingly, the external impact applied to the buffering member 11 may be absorbed by the buffering member 11, and the influence of the external impact applied to the cover 140 disposed on the buffering member 11 may be reduced.

Figure 8:
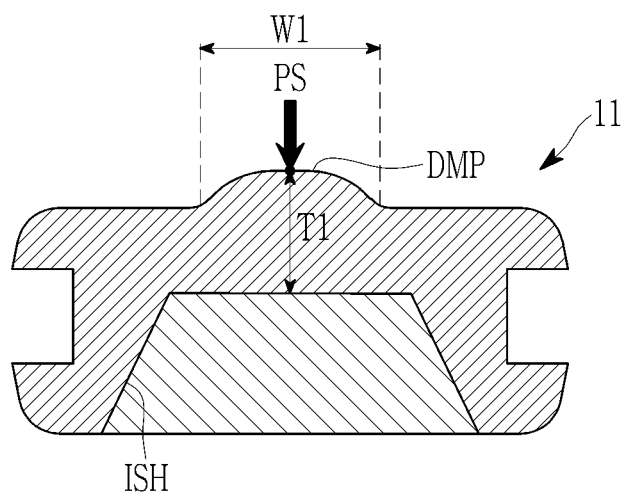
FIG. 8 and FIG. 9 are cross-sectional views of a case in which an external impact is applied to a buffering member of a camera module according to another embodiment.
Figure 9:
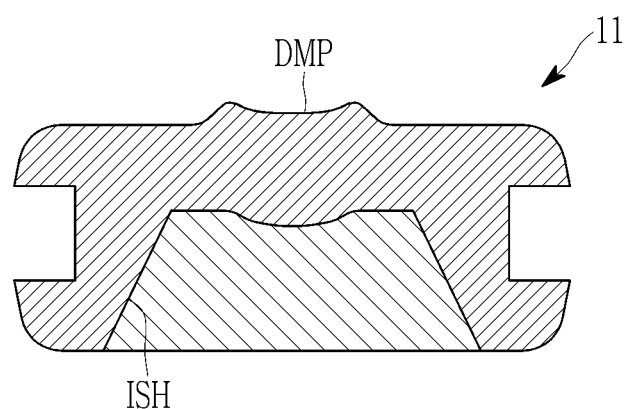
Figure 10:
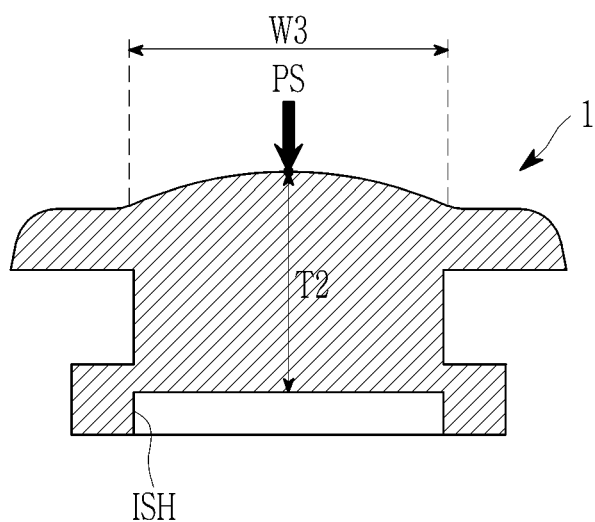
FIG. 10 is a cross-sectional view of a case in which an external impact is applied to a buffering member of a conventional camera module.

Referring to FIG. 8 to FIG. 10 together with FIG. 7, a change in a buffering member 11 of a camera module 100 according to another embodiment in which an external impact is applied to the buffering member 11 will be described. FIG. 8 and FIG. 9 are cross-sectional views of a case in which an external impact is applied to a buffering member of a camera module according to another embodiment. FIG. 10 is a cross-sectional view of a case in which an external impact is applied to a buffering member of a conventional camera module.

Referring to FIG. 8, when an external impact PS is applied to a buffering member 11, the external impact PS may be concentrated on the dome-type protruding portion DMP protruded upward.

As previously described with reference to FIG. 7, in the camera module, according to an embodiment, the first depth D1, which is the maximum depth of the groove ISH formed in the bottom surface LSF of the buffering member 11, is greater than the maximum height H1 of the third portion R3 of the buffering member 11. The first thickness T1, which is the maximum thickness of the central portion of the buffering member 11, including the dome-type protruding portion DMP, is smaller than the sum of the thickness of the first portion R1 and the thickness of the second portion R2 of the buffering member 11. In addition, the first width W1 of the dome-type protruding portion DMP of the buffering member 11 may be smaller than the second width W2 of the upper surface of the groove ISH formed in the bottom surface LSF of the buffering member 11.

Therefore, as shown in FIG. 9, the dome-type protruding portion DMP may be easily deformed due to an external impact on the dome-type protruding portion DMP.

As such, the external impact PS on the buffering member 11 can be absorbed by the buffering member 11, and compared to the case that the buffering member 11 is not easily deformed. Accordingly, the amount of external impact according to the external impact PS transmitted to the cover 140 positioned on the buffering member 11 may be relatively small.

Referring to FIG. 10, the depth of the groove ISH formed in the bottom surface of a buffering member 1 of the conventional camera module may be smaller than the height of the third portion R3 of the buffering member 10. The second thickness T2, which is the maximum thickness of the central portion of the dome-type protruding portion DMP of the buffering member 1, including the dome-type protruding portion DMP, may be greater than the sum of the thickness of the first portion R1 and the thickness of the second portion R2. In addition, a third width W3 of the third portion of the central portion of the buffing member 1, including the dome-type protruding portion DMP, may be almost the same as or greater than the width of the groove ISH formed in the bottom surface of the buffering member 1. As such, when the second thickness T2, which is the maximum thickness of the central portion of the buffering member 1 including the dome-type protruding portion DMP, is thick and the width of the dome-type protruding portion DMP is wide, the central portion of the buffering member 1 including the dome-type protruding portion DMP may not be easily changed even through the external impact PS on the dome-type protruding portion DMP of the buffering member 1.

As described, since the buffering member 1 is not deformed even with the external impact PS applied, the external impact PS may not be absorbed by the buffering member 1, and thus, the amount of external impact according the external impact PS may be easily transmitted to the cover 140 disposed on the buffering member 1. Accordingly, the seam of the cover 140 may become deformed.

As such, the buffering members of the camera module, according to the embodiments, form a deep groove on the bottom surface of the buffering members to form a thin central portion, including the dome-type protruding portion, and the width of the central portion, including the dome-type protruding portion may be formed narrower than the width of the groove formed on the bottom surface of the buffering members. Therefore, since the thickness and width of the central portion, including the dome-type protruding portion of the buffering members of the camera module, according to the embodiment, decrease when an external impact is applied externally, the central portion, including the dome-type protruding portion, may be easily deformed. Accordingly, the buffering members can absorb an external impact on the buffering members. Thus, the amount of external impact according to the external impact transmitted to the cover disposed on the buffering members may be relatively small.

Embodiments disclosed provide a camera module that can prevent the seam of the cover from being separated due to impact by absorbing the impact on the lens barrel.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a lens holder accommodating a lens module;
a carrier accommodating the lens holder;
a lens driver cover disposed on the carrier and covering the lens holder; and
a buffering member comprising a first portion fixed to the lens driver cover, a second portion extending from a top surface of the first portion and comprising a dome-type protruding portion, a third portion extending from a bottom surface of the first portion, and a groove extending from a bottom surface of the third portion toward the first portion,
wherein a maximum depth of the groove measured along a first direction parallel to an optical axis of the lens module from the bottom surface of the third portion is greater than a maximum height of the third portion measured along the first direction from the bottom surface of the third portion, greater than a minimum height of a portion of the first portion contacting the lens driver cover measured along the first direction from the bottom surface of the third portion, and smaller than a maximum height of the first portion measured along the first direction from the bottom surface of the third portion.

2. The camera module of claim 1, further comprising:
a housing configured accommodating the carrier; and
a cover disposed on the housing and covering the lens driver cover,
wherein the dome-type protruding portion faces the cover along the first direction.

3. The camera module of claim 2, wherein the third portion faces the lens holder along the first direction.

4. The camera module of claim 2, wherein the first portion comprises a recess portion having a width narrower than a width of the second portion and a width of the third portion along a second direction perpendicular to the optical axis, and
the recess portion of the buffering member is fixed to the lens driver cover.

5. The camera module of claim 2, wherein the dome-type protruding portion overlaps the groove along the first direction.

6. The camera module of claim 5, wherein a width of the dome-type protruding portion is narrower than a width of the groove along a second direction perpendicular to the optical axis.

7. The camera module of claim 6, wherein the width of the groove tapers toward an upper surface of the groove, and the groove has a minimum width at the upper surface of the groove along the second direction.

8. The camera module of claim 7, wherein the width of the dome-type protruding portion is narrower than the minimum width of the groove.

9. The camera module of claim 1, wherein the dome-type protruding portion overlaps the groove along the first direction, and
a width of the dome-type protruding portion is narrower than a width of the groove along a second direction perpendicular to the optical axis.

10. The camera module of claim 9, wherein the width of the groove tapers toward an upper surface of the groove, and the groove has a minimum width at the upper surface of the groove.

11. The camera module of claim 10, wherein the width of the dome-type protruding portion is narrower than the minimum width of the groove along the second direction.

12. A camera module comprising:
a lens holder accommodating a lens module;
a carrier accommodating the lens holder;
a lens driver cover disposed on the carrier and covering the lens holder; and
a buffering member comprising a first portion fixed to the lens driver cover, a second portion extending from a top surface of the first portion and comprising a dome-type protruding portion, a third portion extending from a bottom surface of the first portion, and a groove extending from a bottom surface of the third portion toward the first portion,
wherein a maximum depth of the groove measured along a first direction parallel to an optical axis of the lens module from the bottom surface of the third portion is greater than a minimum height of a portion of the first portion contacting the lens driver cover measured along the first direction from the bottom surface of the third portion, and
a width of the dome-type protruding portion of the buffering member is narrower than a width of the groove of the buffering member along a second direction perpendicular to the optical axis of the lens module.

13. The camera module of claim 12, further comprising:
a housing accommodating the carrier; and
a cover disposed on the housing and covering the lens driver cover,
wherein the dome-type protruding portion faces the cover along the first direction.

14. The camera module of claim 13, wherein the third portion faces the lens holder along the first direction.

15. The camera module of claim 14, wherein the first portion comprises a recess portion having a width narrower than a width of the second portion and a width of the third portion along the second direction, and
the recess portion of the buffering member is fixed to the lens driver cover.

16. The camera module of claim 15, wherein the width of the groove along the second direction tapers toward an upper surface of the groove, and the groove has a minimum width at the upper surface of the groove.

17. The camera module of claim 16, wherein the width of the dome-type protruding portion is narrower than the minimum width of the groove along the second direction.

\* \* \* \* \*